United States Patent
Fujioka

(10) Patent No.: US 10,000,621 B2
(45) Date of Patent: Jun. 19, 2018

(54) POLYURETHANE TRANSMISSION BELT AND BELT-MOLDING MATERIAL

(71) Applicant: BANDO CHEMICAL INDUSTRIES, LTD., Kobe-shi (JP)

(72) Inventor: Shigeyuki Fujioka, Kobe (KR)

(73) Assignee: BANDO CHEMICAL INDUSTRIES, LTD., Kobe-Shi (JP)

( * ) Notice: Subject to any disclaimer, the term of this patent is extended or adjusted under 35 U.S.C. 154(b) by 0 days. days.

(21) Appl. No.: 15/033,883

(22) PCT Filed: Sep. 29, 2014

(86) PCT No.: PCT/JP2014/075924
§ 371 (c)(1),
(2) Date: May 2, 2016

(87) PCT Pub. No.: WO2015/068496
PCT Pub. Date: May 14, 2015

(65) Prior Publication Data
US 2016/0264756 A1 Sep. 15, 2016

(30) Foreign Application Priority Data
Nov. 8, 2013 (JP) .................. 2013-232344

(51) Int. Cl.
| C08K 5/12 | (2006.01) |
| F16G 1/14 | (2006.01) |
| F16G 1/28 | (2006.01) |
| F16G 5/12 | (2006.01) |
| C08G 18/48 | (2006.01) |
| C08G 18/76 | (2006.01) |
| F16G 1/16 | (2006.01) |

(52) U.S. Cl.
CPC ............ *C08K 5/12* (2013.01); *C08G 18/4854* (2013.01); *C08G 18/7621* (2013.01); *F16G 1/14* (2013.01); *F16G 1/16* (2013.01); *F16G 1/28* (2013.01); *F16G 5/12* (2013.01)

(58) Field of Classification Search
CPC ..... C08K 5/12; F16G 1/14; F16G 1/28; F16G 5/12
See application file for complete search history.

(56) References Cited

U.S. PATENT DOCUMENTS

| 2008/0085988 A1 | 4/2008 | Siddhamalli |
| 2010/0286297 A1 | 11/2010 | Ortalda et al. |
| 2011/0232825 A1* | 9/2011 | Mack ............... C08G 18/10 156/71 |
| 2013/0267639 A1* | 10/2013 | Zhuang ............... C08L 75/04 524/285 |

FOREIGN PATENT DOCUMENTS

| JP | 2010163557 A | 7/2010 |
| JP | 2011505443 A | 2/2011 |
| JP | 2012251586 A | 12/2012 |
| WO | 2009068515 A1 | 6/2009 |
| WO | 2012010559 A1 | 1/2012 |
| WO | 2015007731 A1 | 1/2015 |

OTHER PUBLICATIONS

Notification Concerning Transmittal of International Preliminary Report on Patentability (PCT/IB326) and Notification of Transmittal of Translation of the International Preliminary Report on Patentability (PCT/IB/338) dated May 19, 2016, with International Preliminary Report on Patentability (PCT/IB/373) and Written Opinion of the International Searching Authority (PCT/ISA/237), for corresponding international application PCT/JP2014/075924.
International Search Report (ISR) dated Dec. 22, 2014, issued for International application No. PCT/JP2014/075924.
Extended European Search Report (EESR) dated Jun. 13, 2017, issued for European counterpart patent application No. EP14859757.

* cited by examiner

*Primary Examiner* — Robert Harlan
(74) *Attorney, Agent, or Firm* — Law Office of Katsuhiro Arai

(57) ABSTRACT

An object is to provide a polyurethane transmission belt offering excellent durability, as well as a belt-molding material for manufacturing such transmission belt. As a solution, a polyurethane transmission belt is provided that contains 1,2-cyclohexane dicarboxylic acid diisononyl ester expressed by Chemical Formula (1) below.

[Chemical Formula 1]

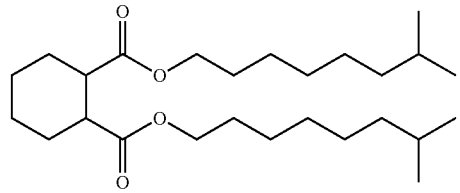

8 Claims, 1 Drawing Sheet

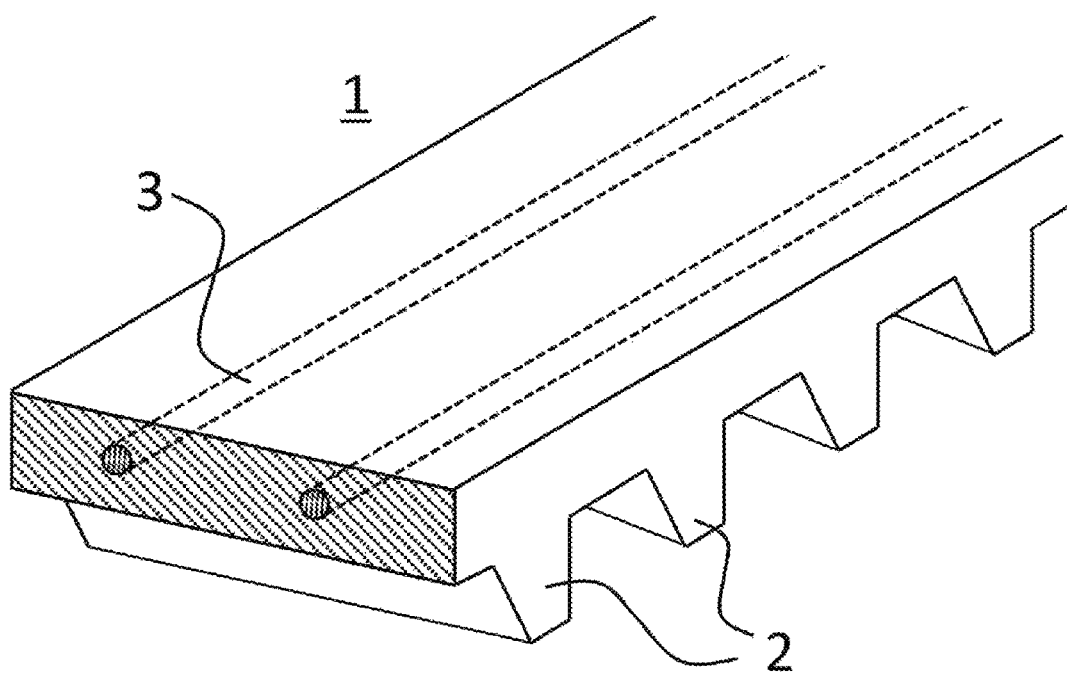

POLYURETHANE TRANSMISSION BELT AND BELT-MOLDING MATERIAL

This application is the U.S. National Phase under 35 U.S.C. § 371 of International Application PCT/JP2014/075924, filed Sep. 29, 2014, which claims priority to Japanese Patent Application No. 2013-232344, filed Nov. 8, 2013. The International Application was published under PCT Article 21(2) in a language other than English.

TECHNICAL FIELD

The present invention relates to a polyurethane transmission belt and belt-molding material.

BACKGROUND ART

Polyurethane transmission belts are used in general industrial machinery, OA equipment, etc. Such polyurethane transmission belts are formed by a belt-molding material that contains prepolymer synthesized from trirange isocyanate or other polyisocyanate and polytetramethylene ether glycol or other polyol, 1,1'-methylene bis (o-chloroaniline) or other curing agent, plasticizer, and other additives. This belt-molding material is poured into belt-molding dies and thermally cured into a cylinder shape, after which the cylinder is sliced to the necessary width to manufacture a polyurethane transmission belt.

Polyurethane transmission belts offering improved durability are desired, because they are used for a long period of time under tension.

Patent Literature 1 proposes a polyurethane transmission belt whose durability is improved by adding a lubricant constituted by a grease of 50 to 80° C. in melting point whose primary component is triglyceride. Because it contains a grease of 50 to 80° C. in melting point, this polyurethane transmission belt offers improved durability so long as it is used in a temperature range of room temperature to around 50° C.; however, this belt presents a problem in that the grease seeps onto the belt surface to produce bloom at low temperatures below room temperature, making the belt not durable enough in a low-temperature environment.

BACKGROUND ART LITERATURE

Patent Literature

Patent Literature 1: Japanese Patent Laid-open No. 2012-251586

SUMMARY OF THE INVENTION

Problems to be Solved by the Invention

An object of the present invention is to provide a polyurethane transmission belt offering excellent durability, as well as a belt-molding material for manufacturing such transmission belt.

Means for Solving the Problems

To achieve the aforementioned object, the present invention is constituted as follows:

(1) A polyurethane transmission belt containing 1,2-cyclohexane dicarboxylic acid diisononyl ester.

(2) A polyurethane transmission belt according to (1), characterized by containing the 1,2-cycloyexane dicarboxylic acid diisononyl ester by 5 to 40 parts by weight relative to 100 parts by weight of a prepolymer synthesized from polyisocyanate and polyol.

(3) A polyurethane transmission belt according to (1) or (2), characterized by having a Shore A hardness of 85 to 93.

(4) A polyurethane transmission belt according to any one of (1) to (3), characterized by not containing phthalate ester plasticizer.

(5) A polyurethane transmission belt according to any one of (1) to (4), characterized by being a V belt or toothed belt.

(6) A belt-molding material characterized by containing at least a prepolymer synthesized from polyisocyanate and polyol, as well as 1,2-cyclohexne dicarboxylic acid diisononyl ester.

Effects of the Invention

Offering excellent bleed-out property, 1,2-cyclohexane dicarboxylic acid diisononyl ester is a high-functioning plasticizer that seeps onto the belt surface to function as a lubricant and surface protectant. In addition, 1,2-cyclohexane dicarboxylic acid diisononyl ester has excellent non-volatility and thus remains on the belt surface for a long period of time and provides sustained effects as a lubricant and surface protectant. For this reason, the durability of a polyurethane transmission belt can be improved by adding 1,2-cyclohexane dicarboxylic acid diisononyl ester.

BRIEF DESCRIPTION OF THE DRAWINGS

FIG. 1 Drawing showing the structure of a transmission belt.

DESCRIPTION OF THE SYMBOLS

1. Toothed belt
2. Belt tooth
3. Core wire

Mode for Carrying out the Invention

The polyurethane transmission belt proposed by the present invention contains 1,2-cyclohexane dicarboxylic acid diisononyl ester (hydrogenated DINP) expressed by Chemical Formula (1) below, which is a high-functioning plasticizer.

[Chemical Formula 1]

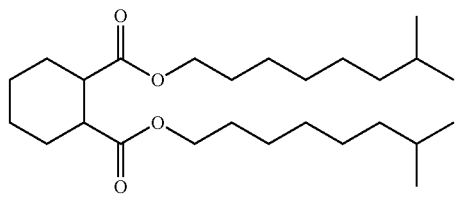

Hydrogenated DINP is obtained by hydrogenating diisononyl phthalate ester (DINP), a common plasticizer, to reduce its benzene ring into cyclohexane. Any plasticizer blended into a polyurethane transmission belt has the effects of lowering the viscosity of the belt-molding material to improve moldability, making the manufactured belt softer to improve flexibility and cold resistance, and seeping onto the belt surface to protect the surface and improve lubrication property and durability, among others.

Hydrogenated DINP is a high-functioning plasticizer capable of substantially improving the durability of a polyurethane transmission belt compared to the di-(2-ethyl hexyl) phthalate (DOP) expressed by Chemical Formula (2) below, dioctyl adipate (DOA) expressed by Chemical Formula (3) below, and other conventional plasticizers.

[Chemical Formula 2]

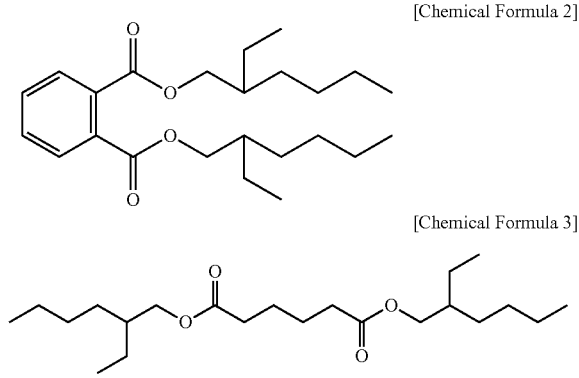

[Chemical Formula 3]

Table 1 shows the melting points, boiling points, and molecular weights of hydrogenated DINP, DOP and DOA.

TABLE 1

|  | Hydrogenated DINP | DOP | DOA |
| --- | --- | --- | --- |
| Melting point/° C. | −54 | −55 | −70 |
| Boiling point/° C. | 394 | 386 | 335 |
| Molecular weight | 424 | 391 | 371 |

Hydrogenated DINP has a melting point of −54° C. and is in a liquid state at room temperature. It also has a cyclohexane ring more flexible than aromatic rings, as well as smaller branches of straight side chains. Since its molecular structure is flexible and not bulky, hydrogenated DINP can easily move in a three-dimensional mesh structure constituted by polyurethane and has excellent bleed-out property. Hydrogenated DINP also has excellent non-volatility due to its large molecular weight of 424 and high boiling point of 394° C.

The melting point of DOP is roughly the same as that of hydrogenated DINP.

However, DOP has a rigid benzene ring and large branches of 2-ethyl hexyl chains, so its molecular structure is rigid and bulky. Accordingly, DOP cannot move in a three-dimensional mesh structure constituted by polyurethane as easily as hydrogenated DINP and its bleed-out property is also lower.

DOA has a low melting point of −70° C. The molecular structure of DOA has no ring structure and is flexible and straight, so DOA can move easily in a three-dimensional mesh structure constituted by polyurethane, and its bleed-out property is better than DINP. However, DOA has lower non-volatility due to its low boiling point of 335° C.

Hydrogenated DINP improves the durability substantially more than any conventional plasticizer because hydrogenated DINP has both excellent bleed-out property and excellent non-volatility. Due to its excellent bleed-out property, hydrogenated DINP seeps onto the belt surface and functions as a lubricant and surface protectant to let the belt and pulley contact each other smoothly. Also due to its excellent non-volatility, hydrogenated DINP does not volatilize easily and thus remains on the belt and pulley surface for a long period of time, continuously functioning as a lubricant and surface protectant. Furthermore, the effect of hydrogenated DINP to make the polyurethane transmission belt softer also continues, thus preventing the polyurethane transmission belt from hardening easily over time.

The polyurethane transmission belt proposed by the present invention is manufactured by thermally curing in dies a belt-molding material that contains at least a prepolymer and hydrogenated DINP. The curing agent used to harden the belt-molding material is not limited in any way, and may be 1,1'-methylene bis (o-chloroaniline) (MOCA), dimethyl thiotoluene diamine, diethyl toluene diamine or other polyamine, 1,4-butane diol, trimethylol propane or other polyol, for example.

Under the present invention, the polyisocyanate and polyol used to synthesize a prepolymer are not limited in any way.

For the polyisocyanate, any type of polyisocyanate whose molecule contains two or more isocyanate groups can be used without limitation. For example, tolylene diisocyanate, tolidine diisocyanate, diphenyl methane diisocyanate, polymethylene polyphenyl polyisocyanate, carbodiimidized diphenyl methane polyisocyanate, coarse diphenyl methane diisocyanate, xylylene diisocyanate, 1,5-naphthalene diisocyanate, tetramethyl xylene diisocyanate, isophorone diisocyanate, hydrogenated diphenyl methane diisocyanate, hydrogenated xylylene diisocyanate, hexamethylene diisocyanate, dimer acid diisocyanate, norbornene diisocyanate, etc., can be used. Two or more types of the foregoing may be used in combination.

For the polyol, any type of polyol whose molecule has two or more hydroxyl groups can be used without limitation. For example, polyethylene glycol, polypropylene glycol, polytetramethylene ether glycol or other polyether polyol; polyester polyol obtained by causing adipinic acid, sebacic acid, itaconic acid, maleic acid anhydride, terephthalic acid, isophthalic acid, fumaric acid, succinic acid, oxalic acid, malonic acid, glutaric acid, pimelic acid, suberic acid, azelaic acid or other dicarboxylic acid compound to react with ethylene glycol, diethylene glycol, propylene glycol, 1,4-butane diol, 1,6-hexane diol, neopentyl glycol, 1,2-propane diol, 1,3-propane diol, 1,9-nonane diol, 3-methyl-1,5-pentane diol, tripropylene glycol, trimethylol propane, glycerin or other polyol compound; polycaprolactone polyol, poly-β-methyl-δ-valerolactone or other polylactone polyester polyol; polycarbonate polyol obtained by causing 1,3-propane diol, 1,4-butane diol, 1,6-hexane diol, diethylene glycol, polyethylene glycol, polypropylene glycol, polytetramethylene glycol or other diol compound to react with phosgene, dialkyl carbonate, diphenyl carbonate, or the like; or polybutadiene polyol, polyisoprene polyol or other polyolefin polyol, etc., may be used, for example. Two or more types of the foregoing may be used in combination. Other polyol of low molecular weight may also be used in combination with the foregoing.

For the polyol of low molecular weight to be used in combination, ethylene glycol, 1,2-propane diol, 1,3-propane diol, 2-methyl-1,3-propane diol, 2-butyl-2-ethyl-1,3-propane diol, 1,3-butane diol, 1,4-butane diol, neopentyl glycol (2,2-dimethyl-1,3-propane diol), 2-isopropyl-1,4-butane diol, 3-methyl-2,4-pentane diol, 2,4-pentane diol, 1,5-pentane diol, 3-methyl-1,5-pentane diol, 2-methyl-2,4-pentane diol, 2,4-dimethyl-1,5-pentane diol, 2,4-diethyl-1,5-pentane diol, 1,5-hexane diol, 1,6-hexane diol, 2-ethyl-1,3-hexane diol, 2-ethyl-1,6-hexane diol, 1,7-heptane diol, 3,5-heptane diol, 1,8-octane diol, 2-methyl-1,8-octane diol, 1,9-nonane diol, 1,10-decane diol or other aliphatic diol, cyclohexane dimethanol (such as 1,4-cyclohexane dimethanol), cyclohexane diol (such as 1,3-cyclohexane diol and 1,4-cylohexane diol), 2-bis (4-hydroxy cyclohexyl)-propane or other alicyclic diol, trimethylol ethane, trimethylol propane, hexitol, pentitol, glycerin, polyglycerin, pentaerythritol, dipentaerythritol, tetramethylol propane or other trivalent or higher valent polyol can be used, for example.

The blending ratio of prepolymer and curing agent is determined according to the number of functional groups in each compound. To be specific, it is preferable from the viewpoint of the strength and other characteristics of the polyurethane to be obtained, to blend the prepolymer and curing agent so that the mol ratio of the isocyanate (NCO) groups of the former and the active hydrogen groups among the functional groups of the latter (NCO/active hydrogen groups) falls within a range of 1.2 to 0.9. More preferably the mol ratio falls within a range of 1.1 to 1.02. The type of active hydrogen groups constituting the curing agent is not limited in any way, and it may be hydroxyl group, amino group, imino group, carboxyl group, urethane group, thiol group or epoxy group, among others.

The polyurethane transmission belt is manufactured by thermally curing in dies a belt-molding material that contains at least a prepolymer and hydrogenated DINP. For this reason, preferably the prepolymer synthesized from polyisocyanate and polyol is in liquid state so that it can be poured into the dies easily.

Preferably the polyurethane transmission belt proposed by the present invention contains 5 to 40 parts by weight of hydrogenated DINP relative to 100 parts by weight of prepolymer. More preferably hydrogenated DINP is contained by 10 to 30 parts by weight, or even more preferably it is contained by 20 to 30 parts by weight. If the content of hydrogenated DINP is less than 5 parts by weight, the hydrogenated DINP does not seep onto the belt surface fully and therefore lubrication property and surface protection property cannot be achieved, resulting in weak protection of the belt surface. If the content of hydrogenated DINP is more than 40 parts by weight, on the other hand, the polyurethane obtained after hardening becomes too soft and not durable enough, causing the transmission belt to fracture easily.

The polyurethane transmission belt proposed by the present invention can contain a lubricant, surface active agent, filler, pigment, dye, hydrolysis suppressant, reaction promoter, etc., if necessary. The polyurethane transmission belt proposed by the present invention need not contain a lubricant because its lubrication property has been improved by adding hydrogenated DINP. Also, another plasticizer such as DOA may be blended so long as hydrogenated DINP is contained by 5 to 40 parts by weight. It should be noted, however, that DOP, DINP and other phthalate esters are strongly suspected as endocrine disruptors presenting risks of reproduction toxicity, and therefore preferably they are not blended.

The shape of the polyurethane transmission belt proposed by the present invention is not limited in any way, and the present invention can be used as a toothed belt, V belt, flat belt, round belt, etc.

FIG. 1 shows a toothed belt being an embodiment of the polyurethane transmission belt proposed by the present invention. A toothed belt 1 is formed by a belt body having multiple belt teeth 2 provided on its inner periphery surface at a specified pitch in the lengthwise direction of the belt. Also a core wire 3, which is a tensile body, is provided along the bottom of each belt tooth 2 roughly in the lengthwise direction of the belt and in a manner spiraling cyclically in the widthwise direction of the belt.

The core wire 3 only needs to have effective strength as a tensile body and the material used for this wire is not limited in any way; however, examples include glass fiber, carbon fiber, aramid fiber, polyester fiber, and the like.

Next, a method of manufacturing the toothed belt is explained.

<Core Wire Setting Step>

A core wire is wound spirally at a specified pitch around the outer periphery surface of the cylinder-shaped inner die. Engraved on the outer periphery surface of the inner die at a specified pitch are belt tooth molding grooves that extend in the axial direction. Next, the inner die is inserted into the center of the cylinder-shaped outer die in such a way that a cavity into which to pour a belt-molding material is formed between the inner die and outer die.

<Belt-molding Material Preparation Step>

Prepare a belt-molding material by mixing a liquid prepolymer synthesized from polyisocyanate and polyol, hydrogenated DINP, and other additives as optional components.

<Belt-molding Material Pouring/Hardening Step>

Pour the obtained belt-molding material into the cavity between the inner die and outer die and then heat the dies to thermally cure the belt-molding material.

<Die Removal Step>

Remove the cylinder-shaped precursor to polyurethane transmission belt constituted by the hardened belt-molding material, from the dies.

<Width Cutting Step>

Slice the polyurethane belt precursor removed from the dies, to a specified width to obtain a polyurethane transmission belt.

Next, the present invention is explained more specifically using examples. It should be noted, however, that the present invention is not limited to these examples.

EXAMPLE 1

A liquid prepolymer containing NCO groups at a ratio of 5.7 percent by weight was synthesized by causing 2,4-trilene diisocyanate to react with polytetramethylene ether glycol. One hundred parts by weight of this prepolymer, 5 parts by weight of hydrogenated DINP as high-functioning plasticizer (Hexamoll DINCH manufactured by BASF), and 16 parts by weight of MOCA as curing agent, were blended into a belt-molding material.

This belt-molding material was molded, caused to react for 1 hour at 100° C., and hardened, after which the hardened material was let stand stationary for 4 hours at 100° C. and aged, to prepare a sheet 1 of 2 mm in thickness. Also from this belt-molding material, a polyurethane transmission belt 1 of 200 mm in circumferential length, 4 mm in belt width, and 2mm in tooth pitch, which uses a glass fiber cord as its core wire and has belt teeth on its inner periphery surface, was prepared based on the aforementioned method of manufacturing a toothed belt and under the same hardening conditions used for the aforementioned sheet.

EXAMPLE 2

A sheet 2 and polyurethane transmission belt 2 were prepared in the same manner as in Example 1, except that hydrogenated DINP was added by 10 parts by weight.

EXAMPLE 3

A sheet 3 and polyurethane transmission belt 3 were prepared in the same manner as in Example 1, except that hydrogenated DINP was added by 20 parts by weight.

EXAMPLE 4

A sheet 4 and polyurethane transmission belt 4 were prepared in the same manner as in Example 1, except that hydrogenated DINP was added by 30 parts by weight.

EXAMPLE 5

A sheet 5 and polyurethane transmission belt 5 were prepared in the same manner as in Example 1, except that hydrogenated DINP was added by 40 parts by weight.

EXAMPLE 6

A sheet 6 and polyurethane transmission belt 6 were prepared in the same manner as in Example 1, except that hydrogenated DINP was added by 15 parts by weight and that dioctyl adipate (DOA), commonly used as polyurethane plasticizer, was blended by 15 parts by weight.

COMPARATIVE EXAMPLE 1

A sheet 7 and polyurethane transmission belt 7 were prepared in the same manner as in Example 4, except that DOP was used instead of hydrogenated DINP.

COMPARATIVE EXAMPLE 2

A sheet 8 and polyurethane transmission belt 8 were prepared in the same manner as in Example 4, except that DOA was used instead of hydrogenated DINP.

COMPARATIVE EXAMPLE 3

A sheet 9 and polyurethane transmission belt 9 were prepared in the same manner as in Example 1, except that hydrogenated DINP was added by 3 parts by weight.

COMPARATIVE EXAMPLE 4

A sheet 10 and polyurethane transmission belt 10 were prepared in the same manner as in Example 1, except that hydrogenated DINP was added by 45 parts by weight.

Table 2 shows the blending quantities of plasticizer in the Examples and Comparative Examples.

TABLE 2

|  | Hydrogenated DINP | DOP | DOA |
| --- | --- | --- | --- |
| Example 1 | 5 |  |  |
| Example 2 | 10 |  |  |
| Example 3 | 20 |  |  |
| Example 4 | 30 |  |  |
| Example 5 | 40 |  |  |
| Example 6 | 15 |  | 15 |
| Comparative Example 1 |  | 30 |  |
| Comparative Example 2 |  |  | 30 |
| Comparative Example 3 | 3 |  |  |
| Comparative Example 4 | 45 |  |  |

(Test and Evaluation Methods)

Hardness

Each sheet of 2 mm in thickness was measured for hardness using a Shore A hardness tester.

Glass Transition Temperature (Tg)

A test piece of 5 mm×40 mm in size was cut out from each sheet of 2 mm in thickness and measured for dynamic visco-elasticity at a frequency of 10 Hz, and Tg was measured from the peak top temperature based on the coefficient of loss (tan δ).

Bleed-Out Property

Each ring-shaped polyurethane transmission belt was cut. With its outer periphery surface on which no belt tooth was formed facing the inner side, the belt was bent so that one location roughly at the center in the lengthwise direction formed a ring of approx. 1 cm in diameter, and the belt was fixed with compressive stress applied to its outer periphery surface on which no belt tooth was formed. The belt was let stand stationary as fixed at 23° C. for 24 hours, after which the plasticizer seeping onto the outer periphery surface was wiped off using waste paper containing no solvent. The difference between the weight before the test and the weight after the plasticizer was wiped off was indicated by a relative index based on the value in Comparative Example 1 representing 100, to evaluate the bleed-out property of the plasticizer. The greater the value of the index, the more easily the plasticizer seeps out.

Belt Life

The polyurethane transmission belt was looped around a driving pulley with 20 pulley teeth and a driven pulley with 20 pulley teeth. The belt was run under the conditions of 2500 rpm in driving pulley speed, 0.29 N·m in driven pulley load, 29.4 N in initial belt tension, and at room temperature.

The running time of the belt after the belt started running until it broke was measured, and the measured time was indicated by a relative index based on the running time of the belt in Comparative Example 1 representing 100, to evaluate the belt life.

Weight Loss Due to Heating

The transmission belts 4, 7, 8 containing 30 parts by weight of plasticizer were let stand stationary in a 100° C. oven for 168 hours. The difference between the initial weight of the transmission belt before the test and the weight of the transmission belt removed from the oven was indicated by the formula below, to evaluate the weight loss due to heating.

Weight loss due to heating=(Initial weight−Weight after test)/Initial weight×100(%)

The measured results are shown in Table 3.

TABLE 3

|  | Hardness | Tg/° C. | Bleed-out property (index) | Belt life (index) | Weight loss due to heating/% |
| --- | --- | --- | --- | --- | --- |
| Example 1 | 93 | −18 | 120 | 130 | — |
| Example 2 | 91 | −20 | 140 | 145 | — |
| Example 3 | 90 | −24 | 160 | 150 | — |
| Example 4 | 88 | −26 | 170 | 150 | 4.1 |
| Example 5 | 85 | −28 | 190 | 120 | — |
| Example 6 | 87 | −29 | 200 | 140 | — |
| Comparative Example 1 | 88 | −26 | 100 | 100 | 5.2 |
| Comparative Example 2 | 86 | −30 | 250 | 110 | 11.2 |
| Comparative Example 3 | 94 | −17 | 10 | 100 | — |
| Comparative Example 4 | 83 | −30 | 220 | 70 | — |

SUMMARY

The results of Example 4 and Comparative Examples 1 and 2 in terms of bleed-out property and weight loss due to heating confirmed that hydrogenated DINP is a high-functioning plasticizer offering better bleed-out property and non-volatility than DOP and DOA.

Examples 1 to 6 where hydrogenated DINP, a high-functioning plasticizer, was contained by 5 to 40 parts by weight, achieved a longer belt life than Comparative Examples 1 and 2 containing DOP and DOA, respectively.

Comparative Example 3 containing 3 parts by weight of hydrogenated DINP resulted in a substantially lower bleed-out property compared to Example 1 containing 5 parts by weight of hydrogenated DINP. For this reason, the hydrogenated DINP seeped less onto the belt surface, resulting in poor lubrication property and surface protection property and causing the belt life to become as short as in Comparative Example 1.

The life of the transmission belt in Comparative Example 4 containing 45 parts by weight of hydrogenated DINP was around one half of the life of the transmission belt in Example 5 containing 40 parts by weight of hydrogenated DINP. This is because too much hydrogenated DINP made the rubber too soft. The belt life was even shorter than that in Comparative Example 1.

What is claimed is:

1. A thermoset-polyurethane transmission belt formed by thermally curing a liquid prepolymer synthesized from polyisocyanate and polyol, wherein the thermoset-polyurethane transmission belt contains 1,2-cyclohexane dicarboxylic acid diisononyl ester expressed by Chemical Formula (1) below by 5 to 40 parts by weight relative to 100 parts by weight of the liquid prepolymer, and a core wire is embedded in the thermoset-polyurethane transmission belt

[Chemical Formula 1]

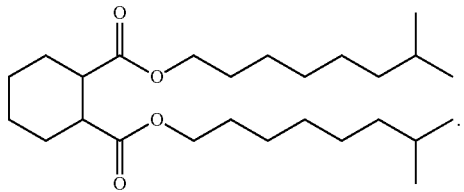

2. A thermoset-polyurethane transmission belt according to claim 1, characterized by having a Shore A hardness of 85 to 93.

3. A thermoset-polyurethane transmission belt according to claim 1, characterized by not containing phthalate ester plasticizer.

4. A thermoset-polyurethane transmission belt according to claim 1, characterized by being a V belt or toothed belt.

5. A thermoset-polyurethane transmission belt according to claim 2, characterized by not containing phthalate ester plasticizer.

6. A thermoset-polyurethane transmission belt according to claim 2, characterized by being a V belt or toothed belt.

7. A thermoset-polyurethane transmission belt according to claim 3, characterized by being a V belt or toothed belt.

8. A thermoset-polyurethane transmission belt according to claim 5, characterized by being a V belt or toothed belt.

* * * * *